(12) United States Patent
Sallee et al.

(10) Patent No.: US 12,311,908 B2
(45) Date of Patent: May 27, 2025

(54) SYSTEM AND METHOD FOR BRAKE PAD CONTROL BASED ON SURFACE ROUGHNESS

(71) Applicant: Rivian IP Holdings, LLC, Plymouth, MI (US)

(72) Inventors: Kevin Jared Sallee, Lake Forest, CA (US); Werner Roland Naegeli, Costa Mesa, CA (US); William Jang, Walnut, CA (US); Somphone Khamly, Hacienda Heights, CA (US); Michael Fei-Kit Tung, Irvine, CA (US); Thomas Frederick Abdallah, Warren, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 176 days.

(21) Appl. No.: 18/148,636

(22) Filed: Dec. 30, 2022

(65) Prior Publication Data

US 2024/0217504 A1   Jul. 4, 2024

(51) Int. Cl.
*B60W 10/184* (2012.01)
*B60W 40/06* (2012.01)

(52) U.S. Cl.
CPC .......... *B60W 10/184* (2013.01); *B60W 40/06* (2013.01)

(58) Field of Classification Search
CPC .. B60W 10/184; B60W 40/06; B60W 40/068; B60T 8/171; B60T 8/172; G06N 3/045; G06N 3/084
See application file for complete search history.

(56) References Cited

U.S. PATENT DOCUMENTS

| | | | | |
|---|---|---|---|---|
| 2009/0184573 A1* | 7/2009 | Nakajima | ............. | B60T 8/4872 303/155 |
| 2020/0001849 A1* | 1/2020 | Medinei | ................ | B60T 17/221 |

FOREIGN PATENT DOCUMENTS

| | | | | |
|---|---|---|---|---|
| JP | 2005104261 A | * | 4/2005 | |
| JP | 2009202860 A | * | 9/2009 | ................ B60T 8/00 |
| JP | 2012245975 A | * | 12/2012 | ................ B60T 8/00 |

* cited by examiner

*Primary Examiner* — Justin Holmes
(74) *Attorney, Agent, or Firm* — Foley & Lardner LLP

(57) ABSTRACT

Systems and methods for brake pad control based on surface roughness are provided. A system can determine a value of roughness associated with traversal of a surface by a vehicle. The system can generate, based on the value of roughness, an instruction to actuate a brake of a wheel of the vehicle to reduce an amount of separation between a rotor of the brake and a pad of the brake. The system can facilitate, based on the instruction, actuation of the brake of the wheel.

18 Claims, 6 Drawing Sheets

SYSTEM AND METHOD FOR BRAKE PAD CONTROL BASED ON SURFACE ROUGHNESS

INTRODUCTION

Vehicles can drive on different types of surfaces. Different components of the vehicle can be impacted based on the different types of surfaces. However, it can be challenging to manage one or more components of the vehicle for a type of surface in order to facilitate driving on the surface.

BRIEF SUMMARY OF THE DISCLOSURE

At least one aspect is directed to a system. The system can include one or more processors coupled with memory. The one or more processors can determine a value of roughness associated with traversal of a surface by a vehicle. The one or more processors can generate, based on the value of roughness, an instruction to actuate a brake of a wheel of the vehicle to reduce an amount of separation between a rotor of the brake and a pad of the brake. The one or more processors can facilitate, based on the instruction, actuation of the brake of the wheel.

At least one aspect is directed to a method. The method can be performed by one or more processors of a vehicle coupled with memory. The method can include the one or more processors determining a value of roughness associated with traversal of a surface by the vehicle. The method can include the one or more processors generating, based on the value of roughness, an instruction to actuate a brake of a wheel of the vehicle to reduce an amount of separation between a rotor of the brake. The method can include the one or more processors facilitating, based on the instruction, actuation of the brake of the wheel.

At least one aspect is directed to a vehicle. The vehicle can include a plurality of wheels. A first wheel of the plurality of wheels can include a brake formed of a rotor and a pad. The vehicle can include an actuator configured to control a separation between the rotor and the pad. The vehicle can include one or more processors coupled with memory. The one or more processors can determine a value of roughness associated with traversal of a surface by the vehicle. The one or more processors can generate, based on the value of roughness, an instruction to actuate the brake of the first wheel of the vehicle to reduce an amount of separation between the rotor of the brake and the pad of the brake to less than or equal to a threshold. The one or more processors can facilitate, based on the instruction, actuation of the brake of the wheel.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of rough road knockback control. The various concepts introduced above and discussed in greater detail below may be implemented in any of numerous ways.

This technology is generally directed to controlling knockback in the brake pad of a vehicle based on the roughness of the surfaces on which the vehicle surfaces. In an illustrative example, the vibration from driving on a rough road can cause a brake caliper piston to partially retract into the caliper itself, which may allow the brake pad to move away from the rotor (e.g., knockback). This may increase the amount of a gap between the brake pad and the rotor relative to when there is no knockback. On the next brake application, the gap caused by the knockback may be first closed before the rotor and the pad come into contact and causes the vehicle to decelerate, thereby introducing a delay between when the brake is applied and when the vehicle begins to decelerate.

This technical solution can control brake pad knockback based on the roughness of a surfaces in order to reduce or prevent the delay between when the brake is applied and the vehicle decelerates. To do so, a data processing system of this technical solution can, based on sensor data, detect when a vehicle is being driven on a rough surface that is likely to induce brake pad knockback. Brake pad knockback can refer to an air gap or separation between the brake pad and the brake rotor of a wheel which can introduce a delay between when a user presses on the brake pedal and when the vehicle begins to decelerate. When driving on such a rough surface has been detected for a specified amount of time, the data processing system can request a predetermined amount of braking, which can close the gap between the pad and rotor, but without causing any vehicle deceleration. Thus, the data processing system of this technical solution can detect and control brake pad knockback based on traversing on a rough road.

Figure 1:
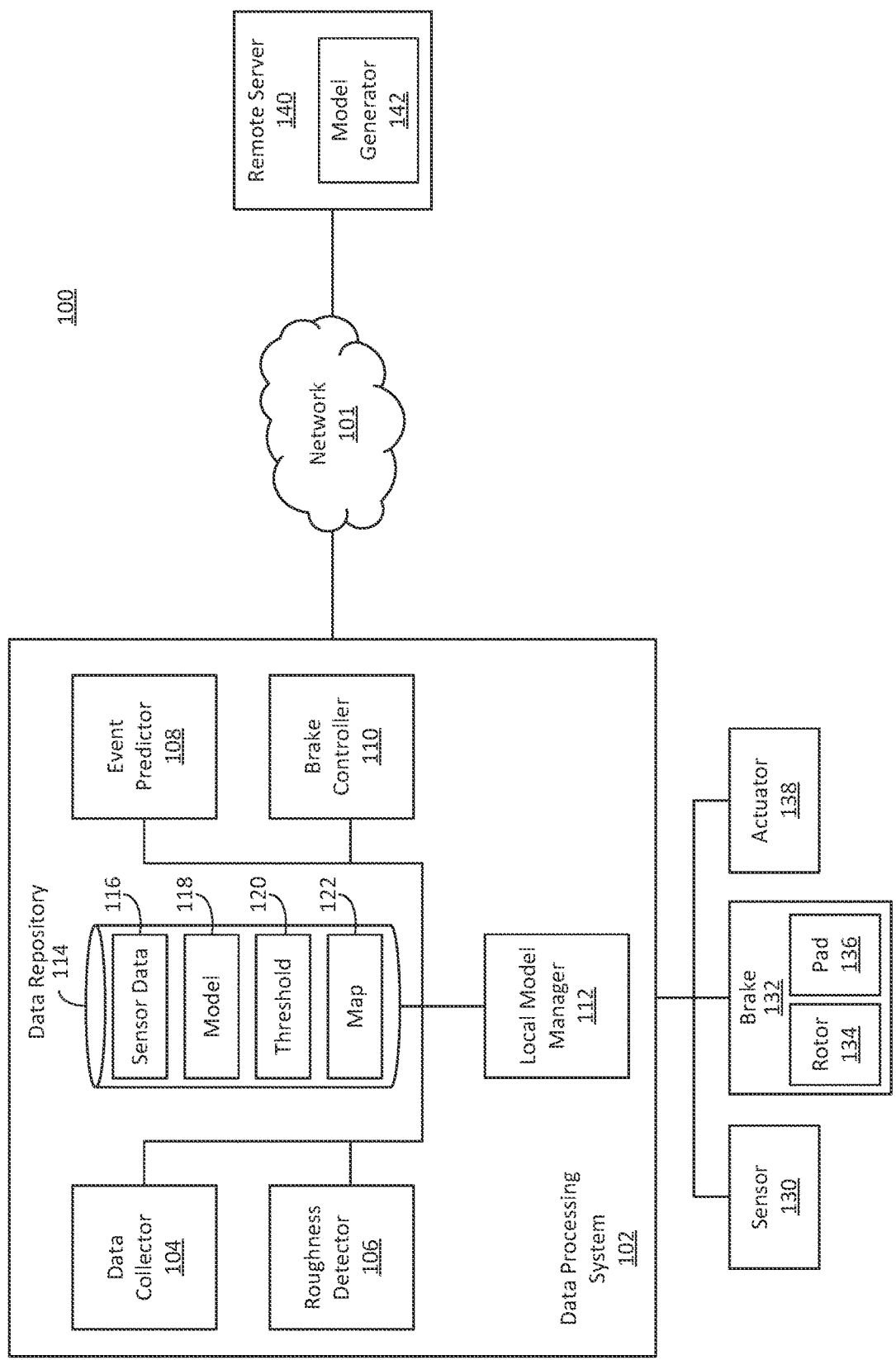
FIG. 1 depicts a block diagram of an example system to control brake pad knockback based on roughness.

FIG. 1 depicts an example of a system 100 for rough road knockback control. The system 100 can include a data processing system 102. The data processing system 102 can include a data collector 104. The data processing system 102 can include a roughness detector 106. The data processing system 102 can include an event predictor 108. The data processing system 102 can include a brake controller 110. The data processing system 102 can include a local model manager 112. The data processing system 102 can include a data repository 114. The components of the data processing system 102 can communicate with each other.

Data repository 114 can receive, store, and send data of various types. Data repository 114 can store sensor data 116. Data repository can store model data 118. Data repository 114 can store threshold data 120. Data repository 114 can store map data 122. Data repository 114 can store other kinds of data. Sensor data 116 can be data from various sensors 130 of the electric vehicle 505. Sensor data 116 can relate to movement of various parts of the vehicle, such as a wheel 555, axle 560, brake 132, rotor 134, pad 136, or the electric vehicle 505 as a whole. Model data 118 can be data from artificial intelligence (AI) or machine learning (ML) models that receive sensor data 116 as inputs and provide roughness indications as outputs. Threshold data 120 can relate to an amount of separation between a rotor 134 and a pad 136. This amount can be measured by sensors 130 in micrometers, millimeters, centimeters, or inches. Threshold data 120 can be stored in a look-up table. Threshold data 120 it can be stored as a part of model data 118. Map data 122 can be geographical coordinates. Map data 122 topographical information about the surface the electric vehicle 505 is traversing.

The data processing system 102 can be in communication with a network 101 or communicate via a network 101. Examples of network 101 can include a local area network ("LAN"), a wide area network ("WAN"), an inter-network (e.g., the Internet), and peer-to-peer networks (e.g., ad hoc peer-to-peer networks). Network 101 can be in communication with a remote server 140. Remote server 140 can include a model generator 142. Data processing system 102 can be in communication with at least one vehicle sensor 130. Data processing system 102 can be in communication with at least one brake 132. Data processing system 102 can be in communication with at least one actuator 138. The brake can include components such as a rotor 134 and a pad 136.

One or more component of the data processing system 102 or remote server 140 can be implemented by a computing system 600, including for example in one or more processors 610 based on instructions or computer code that can be stored in the memory of the computer system 600, such as main memory 615, ROM 620 or a storage device 625.

The sensors 130 can sense movement of an electric vehicle 505. Sensors 130 can include a wheel speed sensor for detecting speed of a wheel 555. Sensors 130 can detect the speed of an electric vehicle 505. Vehicle speed or wheel speed can be measured in units of revolutions per minute or revolutions per second. Vehicle speed or wheel speed can be measured based on a circumference of a wheel 555. For example, if the circumference of a wheel is known, then the wheel revolutions in a given unit of time can be multiplied by the circumference of the wheel to determine how fast the vehicle is moving. The sensors 130 can include an accelerometer for detecting acceleration of a vehicle 505. Vehicle acceleration can be measured in units of revolutions per second squared. Wheel acceleration can be derived from wheel speed. The sensors 130 can include a torque or a force sensor for measuring torque provided by an actuator 138 to a wheel 555 or rotor 134. Torque can be measured in units of Newton-meters. Force can be measured in units of Newtons.

The sensors 130 can include a brake sensor that monitors components of a brake 132. The brake sensor can monitor a thickness of pad 136. The brake sensor can measure inputs in units of millimeters centimeters or inches. The sensors 130 can include an axle sensor. The axle sensor can detect movement of an axle 560. The axle sensor can detect movement of an axle 560 in units of millimeters, centimeters, decimeters, meters, inches, or feet. The sensors 130 can include a wheel sensor. The wheel sensor can detect movement of a wheel 555. The wheel sensor can detect amplitude of motion of a wheel 555 along a first axis that is perpendicular to a second axis that extends along an axle 560 of the wheel associated with the traversal of a surface by the vehicle 505. The wheel sensor can detect motion of the wheel in units of millimeters, centimeters, meters, inches, or feet. The sensors 130 can include a counter. The counter can track a duration of a traversal of a surface by the vehicle.

The counter can provide time stamps for the traversal of the surface by the vehicle. The counter can measure duration of a traversal in units of seconds, minutes, or hours. The sensors 130 can include a pressure sensor. The pressure sensor can measure inputs from an air suspension system. A pressure sensor can be a force transducer. A pressure sensor can be a strain gauge. The pressure sensor can measure inputs in units of millimeters or inches of mercury, pounds per square inch, atmospheres, or pounds per square inch. The sensors 130 can include a damping sensor. The damping sensor can measure inputs in units of Newton seconds per meter. The sensors 130 can include a vibration sensor. A vibration sensor can be an accelerometer. A vibration sensor can be a strain gauge. The vibration sensor can measure impacts to various parts of the electric vehicle 505 caused by traversal of a surface. The vibration sensor can measure inputs in units of Newtons.

The sensors 130 can include at least one camera. Cameras can provide visual information to the electric vehicle 505 or a driver of the electric vehicle about the surface the electric vehicle is traversing. Cameras can detect obstacles. Cameras can detect stop signs. Cameras can detect traffic lights. Cameras can detect other visual inputs that might be important to a driver of an electric vehicle 505. The sensors 130 can include an actuator sensor. The actuator sensor can monitor the position or movement of an actuator 138. The actuator sensor can measure inputs in units of millimeters, centimeters or inches. The sensors 130 can include a temperature sensor, a stress sensor, a motion sensor, a velocity sensor, a speed sensor, an accelerometer, or a power sensor.

The sensors 130 can be located at various locations on the electric vehicle 505. The sensors 130 can be located at or near a wheel 555. The sensors 130 can be located at or near an axle 560. The sensors can be located at or near at or near a brake 132. The sensors 130 can be located at or near a rotor 134. The sensors 130 can be located at or near a pad 136. The sensors 130 can be located at or near an actuator 138. The sensors 130 can be located at or near a chassis 525. The sensors 130 can be located at or near a front portion 530 of the electric vehicle 505. The sensors 130 can be located at or near a body portion 535 of the vehicle 505. The sensors 130 can be located at or near a rear portion 540 of the vehicle 505. The sensors 130 can be located at or near another portion of the vehicle 505.

The brake 132 can be a component of the vehicle 505. The brake 132 can cause the vehicle 505 to decrease in speed. The brake 132 can cause the vehicle 505 to decrease in acceleration. The brake 132 can comprise a rotor 134. The brake 132 can comprise a pad 136. The rotor can be a disc inside of a wheel 555. The rotor 134 can be attached to a wheel 555 by an axle 560. The brake 132 can cause pad 136 to be applied to rotor 134 to slow motion of the rotor 134. Knockback can occur when vibrations from rough roads cause an increased separation between the rotor 134 and pad 136. Knockback can create a delay in time between when a driver of an electric vehicle applies a brake pedal and when the pad 136 is actually applied to the rotor 134. For example, when a vehicle 505 is traversing a rough surface, the surface can create vibrations in a wheel 555. The vibrations in the wheel 555 from the rough surface can cause knockback. Because of the knockback, when the driver of the vehicle 505 tries to press a brake pedal to apply the brakes 132, the increased distance between the rotor 134 and pad 136 can increase the amount of time before the pad 136 makes contact with the rotor to cause deceleration of the vehicle 505. This delay can feel like dead time to the driver because the time difference between engaging the brake pedal and actual deceleration occurring. The data processing system 102 can communicate with at least one brake 132 and at least one actuator 138.

The actuator 138 may increase or decrease the distance between a rotor 134 and a pad 136. An actuator 138 can be an electric actuator. An actuator 138 can be a hydraulic actuator. An actuator 138 can be a pneumatic actuator. The actuator 138 can change the distance between a rotor 134 and a pad 136 according to instructions received from the brake controller 110. The brake controller 110 can receive inputs from the roughness detector 106 before generating braking instructions for the actuator 138. The brake controller 110 can receive inputs from the event predictor 108 before generating instructions for the actuator 138.

The actuator 138 can adjust the distance between rotor 134 and pad 136. The actuator 138 can receive instructions from brake controller 110 to decrease or increase the distance between rotor 134 and pad 136. The brake controller 110 can receive a determination of roughness from roughness detector 106. A roughness determination can be a determination that there is a risk of knockback occurring. Actuator 138 can adjust the distance between rotor 134 and pad 136 responsive to this determination of roughness.

The data processing system 102 can include a data collector 104 designed, constructed or operational to receive, obtain, retrieve, identify, or otherwise access data to facilitate rough road knockback control. The data collector 104 can receive data from one or more data sources. For example, the data collector 104 can receive data via network 101 from a remote server 140. The data collector 104 can receive data or information from one or more sensors 130. The sensors 130 can be located on, within, or otherwise associated with a vehicle, such as electric vehicle 505. The data collector 104 can store the received data or information in the data repository 114 as sensor data 116, for example.

The roughness detector 106 can determine a value of roughness associated with traversal of a surface by an electric vehicle 505. The value of roughness can be referred to as a value of a traversal parameter. Roughness can refer to the quality or state of having an uneven or irregular surface. Roughness can refer to how bumpy a surface is. Roughness can refer to or include vibrations or forces experienced by the electric vehicle 505 as it traverses a surface. Knockback can refer to a separation between a brake pad 136 and a rotor 134. Roughness may cause knockback by causing a brake caliper piston to partially retract into itself. Roughness may cause knockback by causing a separation between a rotor 134 and a pad 136. Roughness can be measured in units of Newtons. The value of roughness determined by the roughness detector can be used as an input for the event predictor 108, the brake controller 110, or the local model manager 112.

The roughness detector 106 can determine the value of roughness based on a duration of a traversal of a surface by the electric vehicle 505. The duration can be an amount of time during which the value of roughness is greater than a threshold. The threshold can be automatically determined by the roughness detector 106. This amount of time can be measured with a time stamp, and time can be tracked in milliseconds, seconds, minutes, or hours. Roughness detector 106 can determine the value of roughness based on an amplitude of motion of the wheel 555 along a first axis that is perpendicular to a second axis that extends along an axle 560 of the wheel 555 associated with the traversal of the surface by the vehicle 505. Roughness detector 106 can receive information about an amplitude of wheel motion from vehicle sensors 130.

The roughness detector 106 can receive data from the data collector 104. The roughness detector 106 can input the data into a model. The model can output an indication of roughness. The roughness detector 106 can determine the value of roughness based on the indication of roughness output by the model. The model can be part of the local model manager 112. Local model manager 112 can utilize one or more machine learning (ML) or artificial intelligence (AI) functions. Local model manager 112 can include a ML functionality model trainer having any combination of hardware and software, including scripts, functions and computer code stored in memory or operating on a processor for determining roughness indications.

Event predictor 108 can determine a likelihood of occurrence of a braking event within a time interval. A braking event can refer to the driver pressing a brake pedal to actuate the brake 132 via actuator 138. A braking event can refer to an autonomous system or functionality of the vehicle 505 sending a command to the actuator 138 to actuate the brake 132. A braking event can occur when a brake 132 causes deceleration of the electric vehicle 505. The event predictor 108 can determine the likelihood of a braking event based on a variety of inputs. The event predictor 108 can determine the likelihood of a braking event based on a driver removing their foot from the accelerator pedal. The event predictor 108 can determine the likelihood of a braking event based on obstacle detection. The event predictor 108 can determine the likelihood of a braking event based on stop sign detection. The event predictor 108 can determine the likelihood of a braking event based on traffic light detection. The event predictor 108 can determine the likelihood of a braking event based on a driver of the electric vehicle removing their foot from the accelerator pedal. The driver removing their foot from the accelerator pedal can be an indication of a braking event because a driver removing their foot from the accelerator can be an indication the driver might want to apply the braking pedal. The event predictor 108 can determine the likelihood of a braking event based on sensor data 116.

Brake controller 110 can be in communication with roughness detector 106 and event predictor 108 to identify how much roughness the vehicle 505 is experiencing, how much roughness the vehicle 505 is likely to experience, and the likelihood of a braking event. Roughness detector 106 can use some or all of these inputs to generate instructions to actuate the brake to reduce knockback.

Brake controller 110 can determine the likelihood that the amount of separation between the rotor 134 and the pad 136 is greater than a first threshold. The first threshold can be the distance normally present between the rotor 134 and the pad 136. The brake controller 110 can facilitate actuation of the brake. For example, the brake controller 110 can provide an instruction to the actuator 138 to actuate the brake 132 responsive to the likelihood that the separation between the rotor 134 and the pad 136 is greater than a second threshold. The second threshold can be an amount of separation greater than the normal distance, which can be caused by roughness. Actuating the brake can consist of decreasing the amount of separation between the rotor 134 and the pad 136.

Brake controller 110 can facilitate actuation of the brake 132. For example, the brake controller 110 can provide the instruction to actuate the brake 132 to reduce the amount of separation based on the value of roughness determined by the roughness detector 106. Brake controller 110 can perform a lookup with the value of roughness determined by the roughness detector 106 to determine an amount of actuation with which to actuate the brake. The amount of the actuation can reduce the amount of separation between the rotor 134 and the pad 136 to greater than a first threshold and less than a second threshold. For example, if a vehicle 505 traversed a very rough surface, roughness detector 106 can determine a high value of roughness due to the traversal. The roughness detector 106 can communicate the high value of roughness to the brake controller 110. The brake controller 110 can perform a lookup using the high value of roughness and determine an amount of actuation to reduce the separation between the rotor 134 and the pad 136 below the second threshold. For another example, if a vehicle 505 traversed a somewhat rough surface over a moderate amount of time, roughness detector 106 can determine a small value of roughness due to the traversal. Brake controller 110 can perform a lookup using the low value of roughness and determine that reducing the separation between the rotor 134 and the pad 136 below the second threshold required a large amount of actuation.

Brake controller 110 can determine an amount of actuation based on an input of a value of roughness into a model calibrated for the vehicle 505. The model calibrated for the vehicle can be part of the local model manager 112. For example, the roughness detector 106 can determine a value of roughness associated with traversal of a surface by a vehicle. The roughness detector 106 can communicate the value of roughness to local model manager 112. Local model manager 112 can input the value of roughness into a model calibrated for the vehicle 505 to determine a likelihood of separation between the rotor 134 and the pad 136. The model can determine if there is a likelihood of separation between the rotor 134 and the pad 136 greater than a first threshold. The model can determine if there is a likelihood of separation between the rotor 134 and the pad 136 greater than a second threshold. The local model manager 112 can communicate the likelihood of separation greater than a first threshold to brake controller 110. Local model manager 112 can communicate the likelihood of separation greater than a second threshold to brake controller 110. Brake controller 110 can generate an instruction to actuate the brake 132 based on a likelihood of separation greater than a second threshold determined by local model manager 112. The amount of actuation can reduce the separation between the rotor 134 and pad 136 to an amount greater than or equal to a first threshold. The first threshold can be an amount that does not cause deceleration of the electric vehicle 505.

Brake controller 110 can predict, based on the value of roughness provided by roughness detector 106, that the amount of separation between the rotor 134 and the pad 136 to be greater than a first threshold. The first threshold can be an amount of separation between the rotor 134 and pad 136 to be greater than a second threshold. The second threshold can be an amount of separation between the rotor 134 and pad 136 not normally present between the rotor 134 and pad 136. Brake controller 110 can provide, responsive to the amount of separation predicted to be greater than or equal to the second threshold, the instruction to actuate the brake 132 to reduce the amount of separation between the rotor 134 and pad 136 to greater than or equal to the first threshold. Brake controller can provide, responsive to the amount of separation predicted to be greater than or equal to the second threshold, the instruction to actuate the brake 132 to reduce the amount of separation between the rotor 134 and pad 136 to an amount less than or equal to the second threshold. Brake controller can provide, responsive to the amount of separation predicted to be greater than or equal to the second threshold, the instruction to actuate the brake 132 to reduce the amount of separation between the rotor 134 and pad 136 to an amount less than or equal to the second threshold and greater than or equal to the first threshold.

The remote server 140 can provide services to the vehicle 505 through the network 101. The remote server 140 can provide services to a driver of the vehicle through the network 101. The remote server 140 can operate as a remote gateway to connect remote users with an organization's internal local area network (LAN). The remote server 140 can support users who are not on the local area network (LAN). The remote server 140 can have one or more processors. The remote server 140 can have access to memory, such as random access memory (RAM).

The remote server 140 can include a model generator 142. The model generator 142 can create models to be used by the local model manager 112. The model generator 142 can train models using artificial intelligence (AI). The model generator 142 can train models using machine learning (ML). The model generator 142 can include a ML functionality model trainer having any combination of hardware and software, including scripts, functions and computer code stored in memory or operating on a processor for determining roughness indications. The model can be trained using historical data. Historical data can be previously stored sensor data 116. Historical data can be previously stored model data 118. Historical data can be previously used threshold data 120. Historical data can be previously used map data 122. Historical data can be other sources of data on the remote server 140 or from the network 101.

Historical data can come from the data repository 114 of the electric vehicle 505. Model generator 142 can use data from the data repository 114 of the electric vehicle 505 to train a custom model for the electric vehicle 505. Model generator 142 can use data from various sources or aggregated data to create at least one template model for local model manager 112 to use. Model generator 142 can use various machine learning models to train new models. Model generator 142 can train new models or update an existing model 118 using one or more of regression, classification, clustering, dimensionality reduction, ensemble methods, neural networks, deep learning, transfer learning, reinforcement learning, unsupervised learning, or supervised learning methods, for example.

The model generator 142 can store other kinds of data. The model generator 142 can use other kinds of data in training new models. For example, the model generator 142 can use data about the type of vehicle to train models for specific vehicle types. An example of data about a type of vehicle can be data about the shape and size of the vehicle. Another example of data about the type of vehicle can be information about the structure of the vehicle. Another example of data about the type of vehicle can be the total amount of miles driven by the vehicle. The model manager can use data about a location mode the vehicle is using. An example of location mode can be on-road mode. Another example of location mode can be off-road mode.

Figure 2:
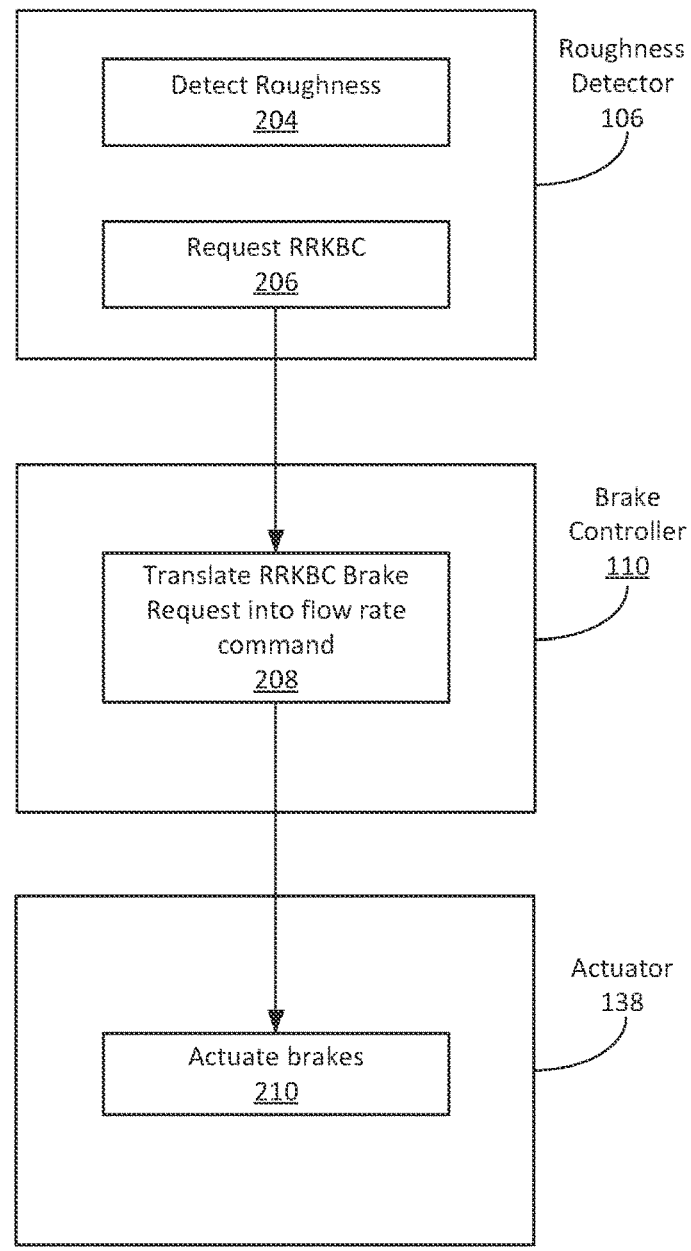
FIG. 2 depicts an operation of an example system to control brake pad knockback based on roughness.

FIG. 2 depicts an embodiment of an operational system 200 for rough road knockback control. The system 200 can include one or more system or component depicted in FIG. 1, FIG. 5, or FIG. 6, including, for example, a data processing system 102, a roughness detector 106, a brake controller 110, or an actuator 138. At ACT 204, the roughness detector 106 can detect roughness. The roughness detector 106 can detect how rough or the level of roughness of a surface on which the vehicle is traversing. The roughness detector can detect the roughness of the road based on various inputs or data received from one or more sensors. In some cases, the roughness detector 106 can detect the roughness of the road based on data received from a vibration sensor. In some cases, the roughness detector can detect or determine the roughness based on location data and performing a lookup in a database with the location info. The roughness detector 106 can determine that the amount or level of roughness is sufficient to cause brake pad knockback. For example, if the average amplitude of vibrations at a certain frequency or frequency range are greater than a threshold, then the roughness detector 106 can determine that the road is rough enough to cause brake pad knockback.

At ACT 206, the data processing system can generate a request for rough road knockback control request (RRKBC). The data processing system can generate the request responsive to determining that the vehicle has been traversing or driving on a rough that has a certain amount of roughness for a certain duration of time. For example, if the average amplitude of vibrations at a certain frequency or frequency range exceeds a threshold for a certain amount of time, the roughness detector 106 can determine that the likelihood that brake pad knockback has occurred is greater than or equal to a threshold. Responsive to determining that the likelihood of brake pad knockback is greater than or equal to a threshold, the roughness detector can generate and transmit a request for rough road knockback control.

The roughness detector 106 can transmit the request for RRKBC to a brake controller 110. The roughness detector 106 can transmit the request via a wired or wireless network or communication interface. The communication 208 from the roughness detector 106 to the brake controller 110 can include a request for RRKBC.

The brake controller 110 can receive the request for RRKBC from the roughness detector 106. At ACT 208, the brake controller 110 can translate the RRKBC request into a flow command or instruction configured to actuate the actuator 138. The brake controller 110 can generate an instruction to actuate the brakes. For example, the brake controller 110 can, at ACT 208, determine the amount of actuation for the actuator 138 to apply in order to close the air gap caused by the rough road knockback. The brake controller 110 can perform a lookup in a database of the data processing system or other memory in order to determine the amount or level of actuation to apply in order to close or reduce the air gap between the rotor and the pad. The amount of level of actuation can correspond to a desired brake torque command. In the event the actuator 138 comprises a hydraulic actuation, the brake controller 110 can convert the desired brake torque command into a flow rate for the hydraulic actuator, and transmit the flow rate command to the hydraulic actuator 138.

The brake controller 110 can transmit the instructions to the actuator 138 via a wired or wireless communication or connection. At ACT 210, the actuator 138 can actuate or apply the brakes responsive to the instructions. The actuator 138 can apply or actuate the brakes by the amount specified by the instructions. By actuating the brakes responsive to and in accordance with the instructions, the actuator 138 can close or reduce the air gap between the rotor and the pad without decelerating the vehicle. Actuating the brake 132 can include decreasing a distance between a rotor 134 and a pad 136. The distance between the rotor 134 and pad 136 can be greater than a first threshold. The distance between the rotor 134 and the pad 136 can be less than a first threshold.

In some cases, the actuator 138 can provide a signal or indication back to the brake controller 110 or roughness detector 106 to indicate that the brakes were applied in accordance with the instructions in order to close or reduce the air gap caused by the rough road knockback.

Figure 3:
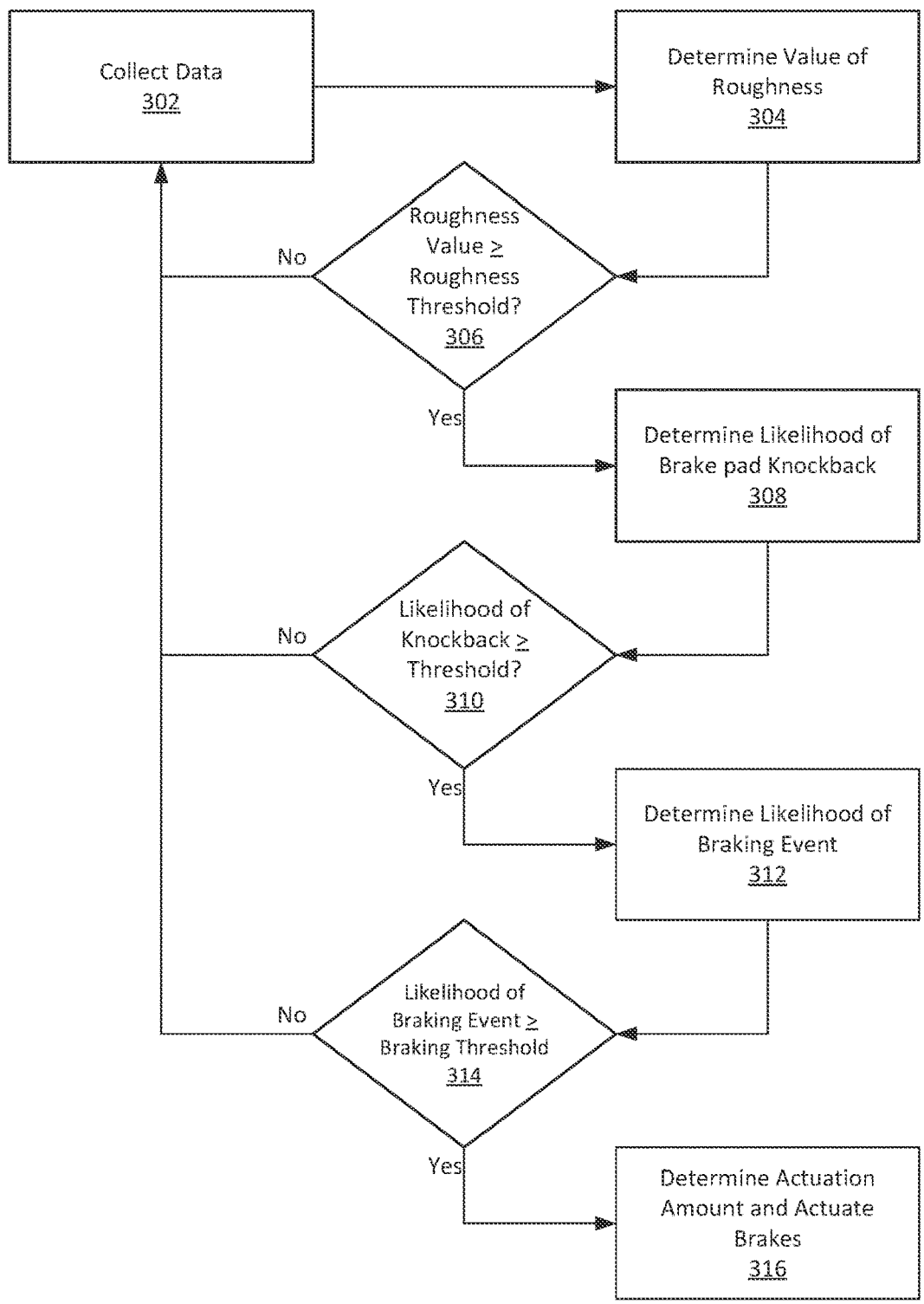
FIG. 3 depicts a flow diagram of an example method of controlling brake pad knockback based on roughness.

FIG. 3 depicts a flow diagram of an example method of controlling brake pad knockback based on roughness. The method 300 can be performed by one or more system or component depicted in FIG. 1, 2, 5, or 6, including, for example, a data processing system. At ACT 302, the data processing system can collect data. The data processing system can collect, receive, monitor, or otherwise obtain data from one or more sensors or data sources. For example, the data processing system can receive or identify data measured or collected by sensors of the vehicle. Vehicle sensors can collect various forms of data, including, for example, data related to one or more of vehicle speed, vehicle velocity, vehicle acceleration, vehicle location, wheel speed, wheel inertia, weather, vibration, force, pressure, or impact. Types of sensors can include, for example, inertial measurement units ("IMU"), gyroscopes, velocity sensors, accelerometers, pressure sensors, transducers, or cameras. The vehicle can utilize a counter or clock to assign or attach timestamps to data collected by the sensors, or the sensors can be configured with counters or clocks.

At ACT 304, the data processing system can determine the value of roughness. The data processing system can determine the value of the roughness based at least in part on the data collected at ACT 302. The data processing system can determine the value of roughness associated with a surface of a road on which the vehicle is traversing. The data processing system can determine the value of roughness based on an amplitude of motion of one or more wheels of the vehicle along a first axis that is perpendicular to a second axis that extends along an axle of the wheel. For example, the vibration can be in a direction that is vertical or in any axis or orientation that can cause or induce brake pad knockback. In some cases, the data processing system can input the data into a model trained with machine learning. The model can be trained to output an indication of roughness based on the input. The data processing system can determine an amplitude, metric or value based on the amount of vibration, for example.

The data processing system can further determine the duration of roughness. The data processing system can use a clock or counter to determine the amount of time the vehicle is traversing a rough road or the duration of a time interval. The data processing system can determine the roughness value based on the amplitude of the vibration and the duration of time, for example. In some cases, the roughness value can be based on a combination of the amplitude of vibration of roughness and the duration. For example, the roughness value can be based on a function of the amplitude of the vibration (or impact or force) and the duration. The combination can include one or more of addition, subtraction, multiplication, division, exponents, or logarithms. The combination can include or be based on a weighted function. The roughness value can be normalized, or a percentage.

At decision block 306, the data processing system can determine whether the roughness value is greater than or equal to a roughness threshold. The data processing system can retrieve the roughness threshold from a data repository. The roughness threshold can be a numerical value that corresponds to an amount of roughness experienced by the vehicle that can induce brake pad knockback. The roughness threshold can be stored in a lookup table in the data repository. The roughness threshold can received from a server, or can be computed, determined or updated by a data processing system of the vehicle (e.g., using a model trained with machine learning). The roughness threshold can be a value specific to, or customized for, the type of vehicle being driven. The roughness threshold can be a value specific to or based on the drive mode being used by the driver. The roughness threshold can be a value specific to or based on the location of the vehicle.

If the roughness value is greater than or equal to the roughness threshold, then the data processing system can proceed to ACT 308. If, on the other hand, the roughness value is less than the roughness threshold, the data processing system can return to ACT 302 to continue collecting or monitoring for data. For example, if the roughness value is less than the roughness threshold, then the data processing system can determine that there is a low likelihood of brake pad knockback.

At ACT 308, the data processing system can determine the likelihood of brake pad knockback. The data processing system can determine the likelihood that brake pad knockback has occurred such that there is an air gap between the brake rotor and the brake pad that is greater than a threshold. The data processing system can determine the likelihood based on an evaluation of the roughness value, the amplitude of roughness or the duration of roughness. The data processing system can determine the likelihood based on the duration that the roughness value exceeds the roughness threshold. For example, the longer the duration the roughness value exceeds the roughness threshold, then the greater the likelihood that brake pad knockback has occurred. The start time for the duration can correspond to when the roughness value exceeded the roughness threshold. For example, a counter can begin counting the duration when the roughness value exceeds the roughness threshold. In some cases, the counter can continue counting until the roughness value falls below the threshold. The data processing system can reset the counter when the roughness value falls below the threshold. The data processing system can stop the counter but not reset the counter when the roughness value falls below the threshold. The data processing system can, in some cases, stop the counter and reset the counter when the brakes are actuated (e.g., by the data processing system, an autonomous navigation system, or manually by the driver). Thus, the data processing system can keep the counter running until the roughness value drops below a threshold or the brake is actuated, and can reset the counter when the roughness value drops below the threshold or the brake is actuated.

The data processing system can determine the likelihood based on additional factors, such as the location of the vehicle, speed of the vehicle, historical occurrences of brake pad knockback at the location of the vehicle by the vehicle or other vehicles that had previously traverses the same location or road. The data processing system can determine the likelihood based on a model trained using machine learning, for example.

The likelihood can be a percentage, such as 50%, 60%, 70%, 80%, 90% or 100%, for example. The likelihood can be a numerical value on a scale of 1 to 10, where 1 can indicate a low likelihood, and 10 can indicate a high likelihood, or vice versa. The likelihood can be categorical, such as low, medium or high.

At decision block 310, the data processing system can determine whether the likelihood of knockback is greater than or equal to a threshold. The data processing system can obtain the threshold from a data repository. The threshold can be 50%, 70%, 80%, for example. In the event the data processing system determines the likelihood as a score on a scale of 1 to 10, then the threshold can be 5, 6, 7, 8, or 9, for example. If the data processing system determines the likelihood as a categorical value, such as "high", then the threshold can be "high" or "medium", for example. If the data processing system determines that the likelihood of knockback is greater than or equal to the threshold, then the data processing system can proceed to ACT 312. If, on the other hand, the data processing system determines that the likelihood of knockback is less than the threshold, then the data processing system can return to ACT 302 to continue to monitor or collect data.

At ACT 312, the data processing system can determine the likelihood of a braking event. A braking event can refer to actuating the brakes or applying the brakes. The data processing system can determine the likelihood that a driver of the vehicle is going to apply the brakes within a predetermined time interval (e.g., 0.5 seconds, 1 second, 2 seconds, 3 seconds, 4 seconds, 5 seconds, 10 seconds, 15 seconds, 30 seconds, 1 minute, 2 minutes or other time interval). The data processing system can determine the likelihood of the braking event can be based on whether the vehicle is approaching a turn in the road, a stop in the road, a bend in the road, a decline in the road, an obstacle on the road, a traffic light, or a destination, for example. The data processing system can determine the likelihood of the braking event based on image interpretation technique, obstacle detection, driver behavior, or map information.

The data processing system can determine the likelihood of the braking event based on the driver releasing the accelerator. For example, a pressure sensor can sense when there is pressure on the accelerator from the foot of the driver. The pressure sensor can sense when pressure from the foot of the driver is removed from the accelerator. The data processing system can determine there is a likelihood of a braking event because the foot of the driver has been removed from the accelerator. The data processing system can determine the likelihood of the braking event based on proximity sensor located on the brake pedal that can detect the proximity of the foot of the driver to the brake pedal.

The data processing system can predict, based on the value of roughness provided by the roughness detector, the likelihood of a braking event. The data processing system can receive an indication of the likelihood of an event via a network from a server. The data processing system can determine the likelihood of an event using a model trained via machine learning. For example, the data processing system can input data collected by one or more sensors of the vehicle into the model to output a likelihood of a braking event occurring within a time interval.

The likelihood of the braking event can be a percentage, such as 50%, 60%, 70%, 80%, 90% or 100%, for example. The likelihood can be a numerical value on a scale of 1 to 10, where 1 can indicate a low likelihood, and 10 can indicate a high likelihood, or vice versa. The likelihood can be categorical, such as low, medium or high.

At decision block 314, the data processing system can determine whether the likelihood of the braking event is greater than or equal to a braking threshold. The data processing system can retrieve the braking threshold from a data repository. The threshold can be 50%, 70%, 80%, for example. In the event the data processing system determines the likelihood as a score on a scale of 1 to 10, then the threshold can be 5, 6, 7, 8, or 9, for example. If the data processing system determines the likelihood as a categorical value, such as "high", then the threshold can be "high" or "medium", for example. If the data processing system determines that the likelihood of a braking event is greater than or equal to the threshold, then the data processing system can proceed to ACT 316. If, on the other hand, the data processing system determines that the likelihood of a braking event is less than the threshold, then the data processing system can return to ACT 302 to continue to monitor or collect data.

At ACT 316, the data processing system can determine an amount of actuation to apply to the brakes. The amount of actuation can correspond to the amount the air gap between the brake pad and the brake rotor is reduced, or the amount of braking force that is generated. Actuating the brake can involve decreasing the distance between the rotor and the brake pad. The amount of actuation can be based on a default value, based on a value of the roughness, or based on the duration associated with the value of the roughness being above the roughness threshold. The amount of actuation can be configured to reduce an air gap between a brake pad and the brake rotor without decelerating the vehicle. By reducing the air gap between the brake pad and the brake rotor responsive to the likelihood of brake pad knockback being greater than a threshold, the data processing system can reduce the delay between when a driver applies the brakes and when the vehicle begins to decelerate. Upon determining the amount of actuation to apply to the brakes, the data processing system can proceed with generating and forwarding an instruction or command to an actuator in order to actuate the brakes in accordance with the determined amount.

Figure 4:
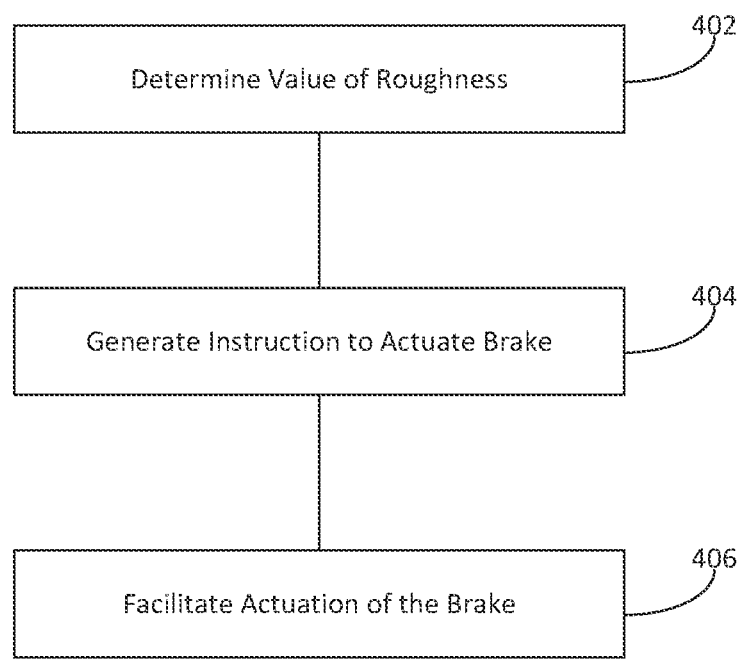
FIG. 4 depicts a flow diagram of an example method of controlling brake pad knockback based on roughness.

FIG. 4 depicts a flow diagram of an example method 400 of controlling brake pad knockback based on roughness. The method 400 can be performed by one or more system or component of FIG. 1, FIG. 2, FIG. 5, or FIG. 6, including, for example, a data processing system. At ACT 402, the data processing system can determine a value of roughness. The data processing system can determine the value of roughness associated with traversal of a surface by a vehicle. Roughness can be a force experienced by an electric vehicle as it traverses a surface. Traversal of a surface can cause vibrations in the electric vehicle. Vibrations in the electric vehicle can cause a separation between a rotor and a brake pad. Roughness can be measured in units of Newtons. The data processing system can determine the value of roughness based on data detected by one or more sensors of the vehicle, such as vibrations from driving on a rough road. The data processing system can determine a duration of roughness, such as a duration that the an amount of roughness exceeds a threshold. The data processing system can determine the roughness value based on the amplitude or amount of roughness and the duration of roughness.

At ACT 404, the data processing system can generate an instruction to actuate one or more brakes of the vehicle. The data processing system can generate the instruction to reduce the amount of separation between the rotor of the brake and the pad of the brake. The data processing system can determine the amount of actuation that reduces the separation between the rotor and the pad, but without causing the vehicle to decelerate. For example, the data processing system can perform a lookup in a data repository to determine a default amount of actuation that is operational to reduce the separation without causing deceleration. In some cases, the data processing system can determine the amount of actuation to reduce separation without deceleration based on the value of roughness or duration of roughness, for example.

At ACT 406, the data processing system can facilitate actuation of the brake. The data processing system can facilitate actuation of the brake of the wheel based on the instruction. The data processing system can provide the instruction to facilitate actuation of the brakes in order to reduce an amount of separation between a rotor of the brake and the pad of the brake without deceleration of the vehicle. For example, the amount of the actuation computed by the processing unit can serve to generate corresponding instructions that reduce the air gap between the pad and the rotor but without causing the pad and the rotor to physically come into contact with one another.

Figure 5:
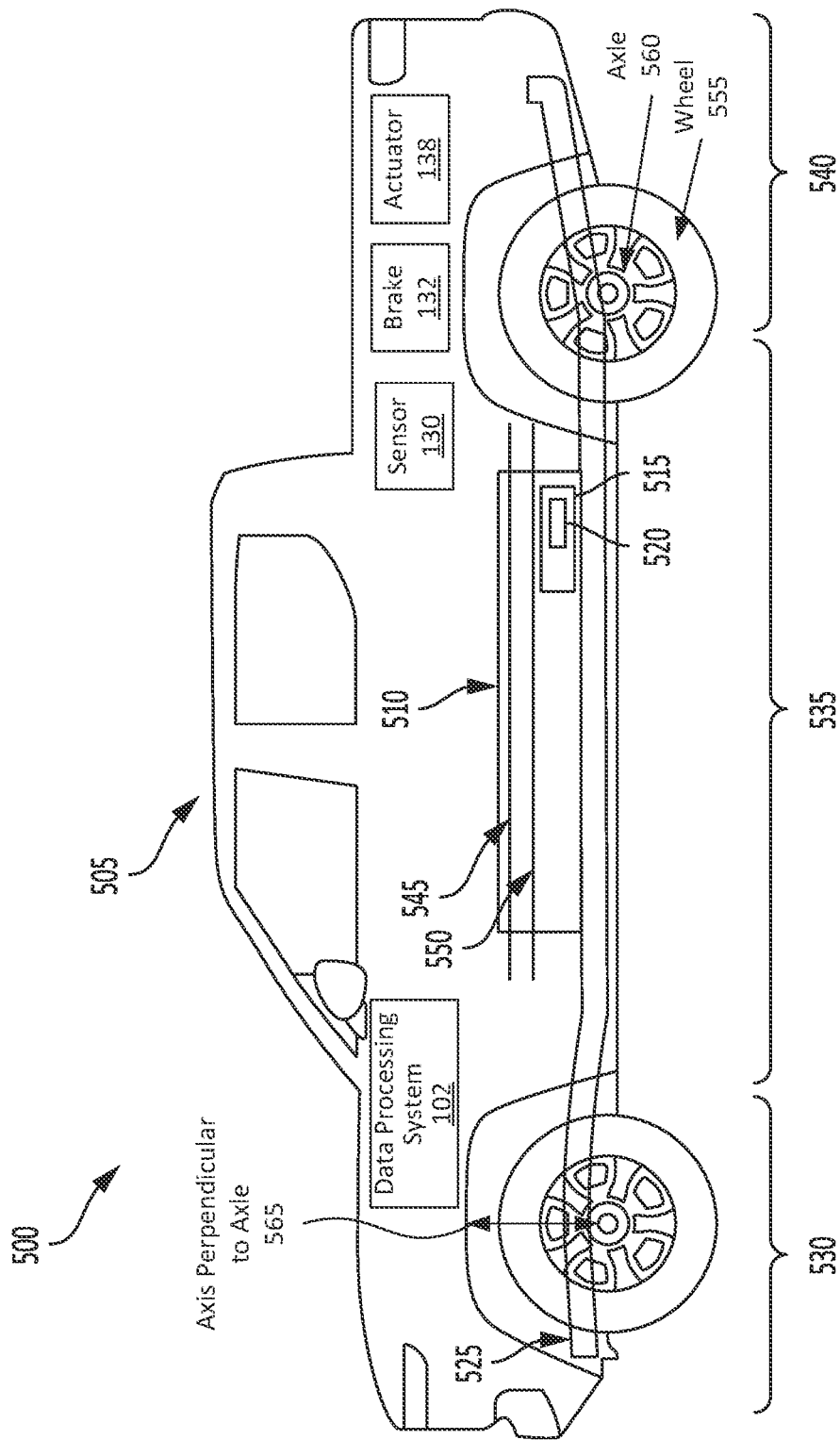
FIG. 5 depicts an electric vehicle.

FIG. 5 depicts an example cross-sectional view 500 of an electric vehicle 505 installed with at least one battery pack 510. Electric vehicles 505 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 510 can also be used as an energy storage system to power a building, such as a residential home or commercial building. Electric vehicles 505 can be fully electric or partially electric (e.g., plug-in hybrid) and further, electric vehicles 505 can be fully autonomous, partially autonomous, or unmanned. Electric vehicles 505 can also be human operated or non-autonomous. Electric vehicles 505 such as electric trucks or automobiles can include on-board battery packs 510, batteries 515 or battery modules 515, or battery cells 520 to power the electric vehicles. The electric vehicle 505 can include a chassis 525 (e.g., a frame, internal frame, or support structure). The chassis 525 can support various components of the electric vehicle 505. The chassis 525 can span a front portion 530 (e.g., a hood or bonnet portion), a body portion 535, and a rear portion 540 (e.g., a trunk, payload, or boot portion) of the electric vehicle 505. The battery pack 510 can be installed or placed within the electric vehicle 505. For example, the battery pack 510 can be installed on the chassis 525 of the electric vehicle 505 within one or more of the front portion 530, the body portion 535, or the rear portion 540. The battery pack 510 can include or connect with at least one busbar, e.g., a current collector element. For example, the first busbar 545 and the second busbar 550 can include electrically conductive material to connect or otherwise electrically couple the battery 515, the battery modules 515, or the battery cells 520 with other electrical components of the electric vehicle 505 to provide electrical power to various systems or components of the electric vehicle 505.

The electric vehicle 505 can include a data processing system 102. The electric vehicle 505 can include at least one vehicle sensor 130. The electric vehicle 505 can include at least one wheel 555. For example, the vehicle 505 can be a four-wheeled vehicle, a two-wheeled vehicle, a three-wheeled vehicle. One or more wheels 555 of the vehicle 505 can include a brake 132, which can include a rotor 134 and pad 136. An actuator 138 can actuate the brake 132 by bringing the rotor 134 and the pad 136 closer together.

The electric vehicle can include at least one axle 560. The axle 560 can extend between a wheel 555 on the left side of the vehicle 505 and a wheel 555 on the right side of the vehicle. When the electric vehicle traverses a surface, the wheel 555 can experience motion perpendicular to the axle 560. For example, a first axis can extend parallel to the axle 560 from the left wheel 555 to the right wheel 555. A second axis 565 can be perpendicular to the first axis of the axle 560. The roughness of the road can be detected by motion of the wheel 555 that is long the second axis 565, which can be perpendicular to the axle 560. This motion caused by the roughness of the road can cause brake pad knockback (e.g., separation between the brake pad and the brake rotor).

Figure 6:
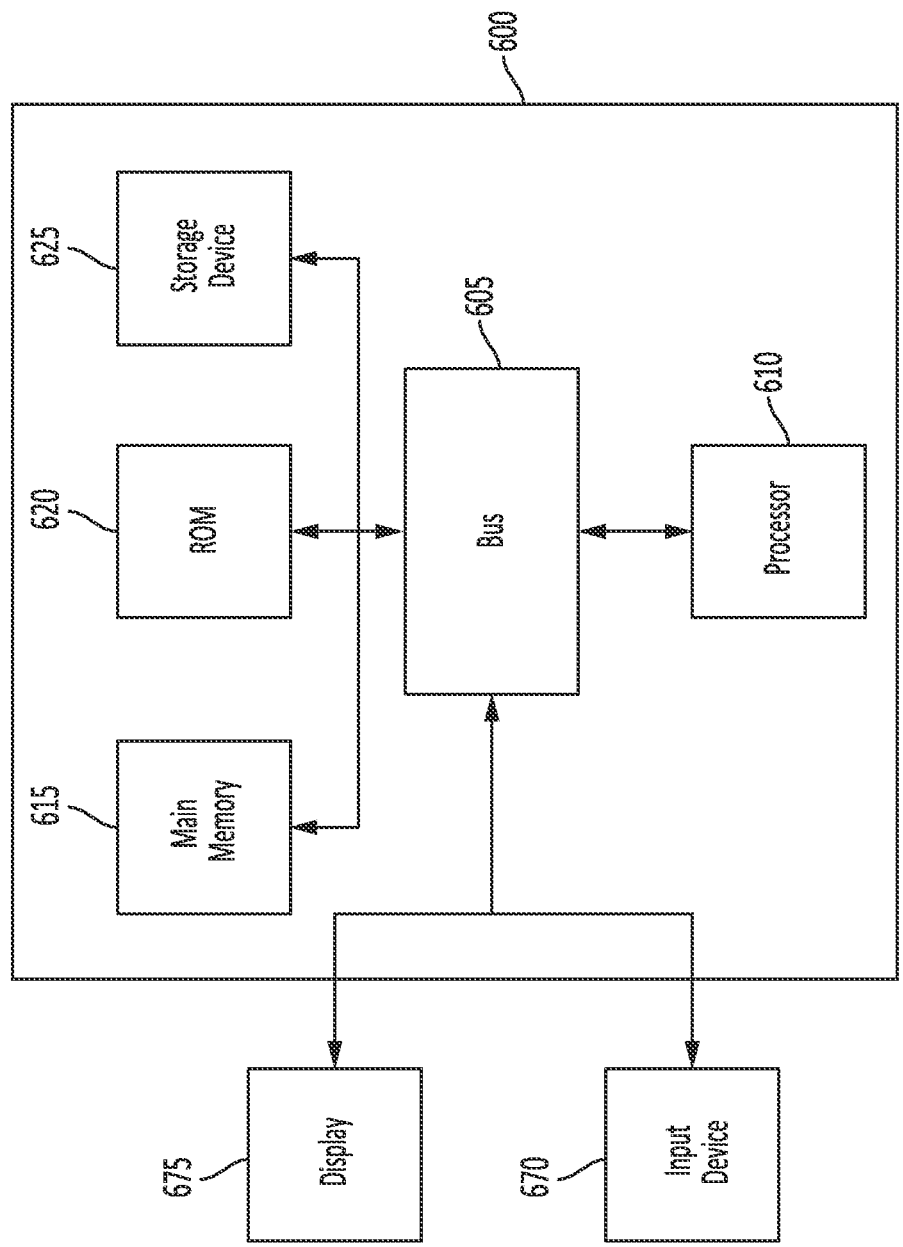
FIG. 6 is a block diagram illustrating an architecture for a computer system that can be employed to implement elements of the systems and methods described and illustrated herein.

FIG. 6 depicts an example block diagram of an example computer system 600. The computer system or computing device 600 can include or be used to implement a data processing system or its components. The computing system 600 includes at least one bus 605 or other communication component for communicating information and at least one processor 610 or processing circuit coupled to the bus 605 for processing information. The computing system 600 can also include one or more processors 610 or processing circuits coupled to the bus for processing information. The computing system 600 also includes at least one main memory 615, such as a random access memory (RAM) or other dynamic storage device, coupled to the bus 605 for storing information, and instructions to be executed by the processor 610. The main memory 615 can be used for storing information during execution of instructions by the processor 610. The computing system 600 may further include at least one read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions.

The computing system 600 may be coupled via the bus 605 to a display 635, such as a liquid crystal display, or active matrix display, for displaying information to a user such as a driver of the electric vehicle 505 or other end user. An input device 630, such as a keyboard or voice interface may be coupled to the bus 605 for communicating information and commands to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
   one or more processors coupled with memory to:
   determine a value of roughness associated with traversal of a surface by a vehicle;
   generate, based on the value of roughness, an instruction to actuate a brake of a wheel of the vehicle to reduce an amount of separation between a rotor of the brake and a pad of the brake;
   perform a lookup with the value of roughness to determine an amount of actuation with which to actuate the brake, wherein the amount of actuation reduces the amount of separation between the rotor and the pad to less than a first threshold and greater than a second threshold; and
   facilitate, based on the instruction, actuation of the brake of the wheel.

2. The system of claim 1, comprising:
   the one or more processors to determine the value of roughness based on a duration of the traversal of the surface by the vehicle.

3. The system of claim 1, comprising:
   the one or more processors to determine the value of roughness based on an amplitude of motion of the wheel along a first axis that is perpendicular to a second axis that extends along an axle of the wheel and associated with the traversal of the surface by the vehicle.

4. The system of claim 1, comprising the one or more processors to:
   receive, from one or more sensors of the vehicle, data for the traversal of the surface by the vehicle; and
   determine the value of roughness based on the data received from the one or more sensors.

5. The system of claim 1, comprising the one or more processors to:
   receive, from one or more sensors of the vehicle, data over a time interval that comprises the traversal of the surface by the vehicle;
   input the data the data into a model trained via machine learning to output an indication of roughness; and
   determine the value of roughness based on the indication of roughness output by the model.

6. The system of claim 1, comprising the one or more processors to:
   determine, based on the value of roughness, a likelihood that the amount of separation between the rotor and the pad is greater than the first threshold; and
   provide the instruction to actuate the brake responsive to the likelihood greater than the second threshold.

7. The system of claim 1, comprising the one or more processors to:
   determine a likelihood of occurrence of a braking event within a time interval; and
   provide the instruction to actuate the brake to reduce the amount of separation based on the value of roughness and responsive to the likelihood of occurrence of the braking event during the time interval greater than a threshold time interval.

8. The system of claim 1, comprising the one or more processors to:
   determine, based on input of the value of roughness into a model calibrated for the vehicle, the amount of actuation; and
   generate the instruction to actuate the brake based on the amount of actuation determined via the model, wherein the amount of actuation reduces the amount of separation to less than or equal to the first threshold.

9. The system of claim 1, comprising the one or more processors to:
   predict, based on the value of roughness, the amount of separation between the rotor and the pad; and
   provide the instruction to actuate the brake to reduce the amount of separation.

10. The system of claim 1, comprising:
    the one or more processors to actuate the brake without deceleration of the vehicle.

11. A method, comprising:
    determining, by one or more processors of a vehicle coupled with memory, a value of roughness associated with traversal of a surface by the vehicle;
    generate, by the one or more processors based on the value of roughness, an instruction to actuate a brake of a wheel of the vehicle to reduce an amount of separation between a rotor of the brake;
    performing, by the one or more processors, a lookup with the value of roughness to determine an amount of actuation with which to actuate the brake, wherein the amount of actuation reduces the amount of separation between the rotor and the pad to less than a first threshold and greater than a second threshold without deceleration of the vehicle; and
    facilitating, by the one or more processors based on the instruction, actuation of the brake of the wheel.

12. The method of claim 11, comprising:

determining, by the one or more processors, the value of roughness based on a duration of the traversal of the surface by the vehicle.

13. The method of claim 11, comprising:

determining, by the one or more processors, the value of roughness based on an amplitude of motion of the wheel along a first axis that is perpendicular to a second axis that extends along an axle of the wheel and associated with the traversal of the surface by the vehicle.

14. The method of claim 11, comprising:

receiving, by the one or more processors from one or more sensors of the vehicle, data for the traversal of the surface by the vehicle; and determining, by the one or more processors, the value of roughness based on the data received from the one or more sensors.

15. The method of claim 11, comprising:

receiving, by the one or more processors from one or more sensors of the vehicle, data over a time interval that comprises the traversal of the surface by the vehicle;

inputting, by the one or more processors, the data the data into a model trained via machine learning to output an indication of roughness; and determine the value of roughness based on the indication of roughness output by the model.

16. The method of claim 11, comprising:

determining, by the one or more processors based on the value of roughness, a likelihood that the amount of separation between the rotor and the pad is greater than the first threshold; and providing, by the one or more processors, the instruction to actuate the brake responsive to the likelihood greater than the second threshold.

17. The method of claim 11, comprising:

determining, by the one or more processors, a likelihood of occurrence of a braking event within a time interval; and providing, by the one or more processors, the instruction to actuate the brake to reduce the amount of separation based on the value of roughness and responsive to the likelihood of occurrence of the braking event during the time interval greater than a threshold time interval.

18. A vehicle, comprising:

a plurality of wheels;

a first wheel of the plurality of wheels comprising a brake formed of a rotor and a pad;

an actuator configured to control a separation between the rotor and the pad; and one or more processors coupled with memory to:
  determine a value of roughness associated with traversal of a surface by the vehicle;
  generate, based on the value of roughness, an instruction to actuate the brake of the first wheel of the vehicle to reduce an amount of separation between the rotor of the brake and the pad of the brake to less than or equal to a first threshold;
  perform, by the one or more processors, a lookup with the value of roughness to determine an amount of actuation with which to actuate the brake, wherein the amount of actuation reduces the amount of separation between the rotor and the pad to less than the first threshold and greater than a second threshold without deceleration of the vehicle; and
  facilitate, based on the instruction, actuation of the brake of the wheel.

* * * * *